US012770771B2

(12) United States Patent
Wang et al.

(10) Patent No.: US 12,770,771 B2
(45) Date of Patent: Oct. 20, 2026

(54) PREFABRICATED TRANSFORMER STATION, OIL-IMMERSED TRANSFORMER, AND PHOTOVOLTAIC SYSTEM

(71) Applicant: Huawei Digital Power Technologies Co., Ltd., Shenzhen (CN)

(72) Inventors: Gewen Wang, Shanghai (CN); Haiyang Pan, Shanghai (CN); Peng Zhou, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 784 days.

(21) Appl. No.: 18/319,007

(22) Filed: May 17, 2023

(65) Prior Publication Data

US 2023/0290559 A1 Sep. 14, 2023

Related U.S. Application Data

(63) Continuation of application No. PCT/CN2020/130047, filed on Nov. 19, 2020.

(51) Int. Cl.

*H01F 27/14* (2006.01)
*H01F 27/02* (2006.01)
*H01F 27/40* (2006.01)

(52) U.S. Cl.

CPC .......... *H01F 27/14* (2013.01); *H01F 27/025* (2013.01); *H01F 2027/404* (2013.01)

(58) Field of Classification Search

CPC ... H01F 27/14; H01F 27/025; H01F 2027/404
See application file for complete search history.

(56) References Cited

U.S. PATENT DOCUMENTS

2015/0014224 A1* 1/2015 Zhang .................... B03C 1/025
209/11

FOREIGN PATENT DOCUMENTS

CN 202307433 U * 7/2012
CN 203721466 U * 7/2014
CN 207939081 U 10/2018
(Continued)

OTHER PUBLICATIONS

Handbook of Auxiliary Equipment Products for Power Stations vol. 9 Electrical Appliances and Porcelain, Compiled by the Electric Power Machinery Bureau of the Ministry of Energy, The Water Resources and Electric Power Press, Jun. 1993, 40 pages (Year: 1993).*
(Continued)

*Primary Examiner* — Malcolm Barnes
(74) *Attorney, Agent, or Firm* — Maier & Maier, PLLC

(57) ABSTRACT

A prefabricated transformer station, an oil-immersed transformer, and a photovoltaic system, and relates to the field of power distribution technologies. The prefabricated transformer station includes a container housing and the oil-immersed transformer. A transformer room is provided inside the container housing, and a top cover of the transformer room is opened. The oil-immersed transformer is installed in the transformer room, and a height of a top of an oil conservator of the oil-immersed transformer is higher than a height of a side wall of the transformer room. The prefabricated transformer station can provide more space for a fuel tank, so as to improve a capacity of the oil-immersed transformer.

17 Claims, 9 Drawing Sheets

(56) References Cited

FOREIGN PATENT DOCUMENTS

| | | | | | |
|---|---|---|---|---|---|
| CN | 208985830 U | | 6/2019 | | |
| CN | 209515397 U | * | 10/2019 | | |
| CN | 111555167 A | * | 8/2020 | .............. | H02J 13/12 |
| CN | 211480700 U | * | 9/2020 | ............... | H02B 7/06 |

OTHER PUBLICATIONS

"Handbook of Auxiliary Equipment Products for Power Stations vol. 9 Electrical Appliances and Porcelain", Compiled by the Electric Power Machinery Bureau of the Ministry of Energy, The Water Resources and Electric Power Press, Jun. 1993, 40 pages.
"Handbook of Engineering Construction Organization Design vol. 3 Construction Technology", China Water Resources and Hydropower Press, Dec. 1987, 12 pages.
Long, "Operation and Maintenance Technology of Converter Station", Southwest Jiaotong University Press, Jul. 2021, 14 pages.
Guangyuan, "Practical Maintenance Electrician"'s Manual, Sea Science and Technology Press, Sep. 2010, 14 pages.
Jiali, "Transformer Fault Diagnosis and Repair", Machinery Industry Press, Sep. 1998, 8 pages.

* cited by examiner

PREFABRICATED TRANSFORMER STATION, OIL-IMMERSED TRANSFORMER, AND PHOTOVOLTAIC SYSTEM

CROSS-REFERENCE TO RELATED APPLICATION

This application is a continuation of International Patent Application No. PCT/CN2020/130047, filed on Nov. 19, 2020, the disclosure of which is hereby incorporated by reference in its entirety.

TECHNICAL FIELD

The embodiments relate to the field of power distribution technologies, a prefabricated transformer station, an installation method, an oil-immersed transformer, and a photovoltaic system.

BACKGROUND

A prefabricated transformer station is a new transformer station that is widely used. The prefabricated transformer station features a small size, a small footprint, light weight, low costs, and high reliability, and can be used in power generation sites such as photovoltaic power stations and wind power stations, and power consumption sites such as mines, factories and enterprises, and oil and gas fields.

The prefabricated transformer station pre-integrates a transformer, a medium-voltage cabinet, and a low-voltage power distribution cabinet in a 20-foot marine container to facilitate construction, installation, reconstruction, and maintenance. The transformer may be a component of the prefabricated transformer station and a capacity of the transformer may be a weight performance index of the prefabricated transformer station.

For a prefabricated transformer station using an oil-immersed transformer, a body (a winding and an iron core) of the oil-immersed transformer is installed in a fuel tank filled with transformer oil. The fuel tank is connected to an oil conservator, and the transformer oil serves as a refrigerating medium and an insulating medium. If a capacity of the oil-immersed transformer increases, a diameter of the iron core of the immersed transformer increases, which leads to an increase in sizes of the oil-immersed transformer and the fuel tank. An increase in the capacity accompanies an increase in a heat dissipation area of the fuel tank. Therefore, a heat dissipator needs to be added accordingly, which further increases space occupation. However, a specification for the 20-foot marine container may limit the capacity of the oil-immersed transformer.

SUMMARY

The embodiments may provide a prefabricated transformer station, an installation method, an oil-immersed transformer, and a photovoltaic system, which is able to improve a capacity of the prefabricated transformer station without changing a size specification for a used container.

According to a first aspect, the embodiments may provide a prefabricated transformer station, where the prefabricated transformer station includes a container housing and an oil-immersed transformer, and the oil-immersed transformer is disposed in a fuel tank. A transformer room is provided inside the container housing, and a top cover of the transformer room is opened. That is, the transformer room includes a base and four sides. The fuel tank of the oil-immersed transformer is installed in the transformer room. The oil conservator is separated from the fuel tank of the oil-immersed transformer, and the oil conservator is installed above the fuel tank, where a height of a top of the oil conservator is higher than a height of a side wall of the transformer room, that is, higher than a height of the container housing.

By using the prefabricated transformer station, the top cover of the transformer room is opened, the oil conservator is installed above the fuel tank, and the height of the top of the oil conservator is higher than the height of the side wall of the transformer room, thereby reducing an internal space of the container housing occupied by the oil conservator. The fuel tank is not limited in height by a specification for the container housing, and therefore, more space can be provided for the fuel tank. The oil-immersed transformer is installed in the fuel tank, and more space is also provided for the oil-immersed transformer, so as to improve a capacity of the oil-immersed transformer.

With reference to the first aspect, in a first possible implementation, the fuel tank and the oil conservator are connected through a pipe, and a gas relay is disposed on the pipe. The gas relay is configured to: when an internal fault occurs in the oil-immersed transformer, generate an alarm or cut off the oil-immersed transformer to protect the prefabricated transformer station.

With reference to the first aspect, in a second possible implementation, the prefabricated transformer station further includes a first butterfly valve, a second butterfly valve, and a third butterfly valve, and the pipe includes a first pipe and a second pipe. The first butterfly valve is connected between a port on a fuel tank side of the gas relay and a first end of the first pipe, and a second end of the first pipe is connected to the fuel tank. The second butterfly valve is connected between a port on an oil conservator side of the gas relay and a first end of the third butterfly valve, a second end of the third butterfly valve is connected to a first end of the second pipe, and a second end of the second pipe is connected to the oil conservator. When the first butterfly valve, the second butterfly valve, and the third butterfly valve are all closed, the second butterfly valve and the third butterfly valve can be disconnected. In this case, the oil conservator together with the second pipe and the third butterfly valve can be detached, and transformer oil leakage of the oil-immersed transformer is avoided, so as to facilitate installation, maintenance, and height adjustment of the oil conservator.

With reference to the first aspect, in a third possible implementation, the oil conservator includes a capsule, an air tube, and an oil conservator body, and the prefabricated transformer station further includes a moisture absorber. The oil conservator is filled with transformer oil and the capsule. The capsule is connected to the moisture absorber outside the oil conservator through the air tube. The moisture absorber is used to maintain a balance between pressure of the oil conservator and the fuel tank and outside pressure.

With reference to the first aspect, in a fourth possible implementation, the base and a grid door of the transformer room are provided with air holes for ventilation and heat dissipation, and for discharging accumulated water or the transformer oil.

With reference to the first aspect, in a fifth possible implementation, a medium voltage used for the prefabricated transformer station ranges from 10 kV to 35 kV.

With reference to the first aspect, in a sixth possible implementation, a low voltage used for the prefabricated transformer station ranges from 0.4 kV to 1.5 kV.

With reference to the first aspect, in a seventh possible implementation, a specification for the container housing is a 20-foot marine container, to meet land and marine standard requirements.

With reference to the first aspect, in an eighth possible implementation, the oil conservator and the fuel tank of the oil-immersed transformer are connected by using a bracket, where the bracket is a detachable bracket, so as to facilitate the installation, the maintenance, and the height adjustment of the oil conservator.

With reference to the first aspect, in a ninth possible implementation, a height of a bottom of the oil conservator is higher than the height of the side wall of the transformer room, so as to provide enough space for the fuel tank of the oil-immersed transformer, thereby facilitating improvement of the capacity of the oil-immersed transformer.

According to a second aspect, the embodiments may further provide an installation method of the prefabricated transformer station, applied to installing the oil-immersed transformer station provided in the foregoing implementations, and the method includes:

Before transportation, the oil conservator of the oil-immersed transformer is separated from the fuel tank of the oil-immersed transformer, and the fuel tank is installed in the transformer room. After arriving at a destination, the top cover of the transformer room is opened and the oil conservator is installed above the fuel tank, where the height of the top of the oil conservator is higher than the height of the side wall of the transformer room.

This method is used to transport the prefabricated transformer station, and the method for transporting the 20-foot container can still be used during transportation, which avoids an increase of transport difficulty and costs.

With reference to the second aspect, in the first possible implementation, before the oil conservator of the oil-immersed transformer is separated from the fuel tank of the oil-immersed transformer, the method further includes:

injecting oil into the fuel tank and oil conservator.

With reference to the second aspect, in the second possible implementation, the method further includes:

during transportation, securing the oil conservator in a low-voltage cabinet accommodating room of the container housing.

According to a third aspect, the embodiments may further provide an oil-immersed transformer, where the oil-immersed transformer is disposed in a prefabricated transformer station, the prefabricated transformer station includes a container housing, a transformer room configured to install the oil-immersed transformer is provided inside the container housing, the top cover of the transformer room is opened, and the oil-immersed transformer includes a fuel tank and an oil conservator. The oil conservator is disposed above the fuel tank, where a height of a top of the oil conservator is higher than a height of a side wall of the transformer room.

The oil conservator of the oil-immersed transformer may not occupy an internal space of the container housing or reduce an occupied internal space. The fuel tank is not limited by a specification for the container housing, and therefore, more space can be provided for the fuel tank. The oil-immersed transformer is installed in the fuel tank, and more space is provided for the oil-immersed transformer, so as to improve a capacity of the oil-immersed transformer.

With reference to the third aspect, in the first possible implementation, the fuel tank and the oil conservator are connected through a pipe, and a gas relay is disposed on the pipe. The gas relay is configured to: when an internal fault occurs in the oil-immersed transformer, generate an alarm or cut off the oil-immersed transformer.

With reference to the third aspect, in the second possible implementation, the prefabricated transformer station further includes a first butterfly valve, a second butterfly valve, and a third butterfly valve; the pipe includes a first pipe and a second pipe; and the first butterfly valve is connected between a port on a fuel tank side of the gas relay and a first end of the first pipe, and a second end of the first pipe is connected to the fuel tank. The second butterfly valve is connected between a port on an oil conservator side of the gas relay and a first end of the third butterfly valve, a second end of the third butterfly valve is connected to a first end of the second pipe, and a second end of the second pipe is connected to the oil conservator. The first butterfly valve, the second butterfly valve, and the third butterfly valve are configured to avoid transformer oil leakage of the oil-immersed transformer when being closed, to enable the second butterfly valve and the third butterfly valve to be disconnected. In this case, the oil conservator together with the second pipe and the third butterfly valve can be detached, and the transformer oil leakage of the oil-immersed transformer is avoided, so as to facilitate installation, maintenance, and height adjustment of the oil conservator.

With reference to the third aspect, in the third possible implementation, the oil conservator includes a capsule, an air tube, and an oil conservator body, and the prefabricated transformer station further includes a moisture absorber. The oil conservator is filled with transformer oil and the capsule. The capsule is connected to the moisture absorber outside the oil conservator through the air tube. The moisture absorber is used to maintain a balance between pressure of the oil conservator and the fuel tank and outside pressure.

With reference to the third aspect, in the fourth possible implementation, the oil conservator is connected to the fuel tank of the oil-immersed transformer by using a bracket, where the bracket is a detachable bracket, so as to facilitate the installation, the maintenance, and the height adjustment of the oil conservator.

According to a fourth aspect, the embodiments may further provide a photovoltaic system, where the photovoltaic system includes the prefabricated transformer station provided in the foregoing implementations, and further includes a photovoltaic inverter. The photovoltaic inverter is disposed at a prestage of the prefabricated transformer station and configured to convert a direct current into an alternating current and then transmit the alternating current to the prefabricated transformer station.

The prefabricated transformer station in this embodiment can provide more space for the fuel tank, and further provide more space for the oil-immersed transformer, so as to improve the capacity of the oil-immersed transformer, that is, improve the capacity of the prefabricated transformer station. As the capacity of the prefabricated transformer station increases, a quantity of prefabricated transformer stations that need to be constructed for the photovoltaic system can be reduced, and construction costs and operation and maintenance costs of the photovoltaic system can also be reduced.

With reference to the fourth aspect, in the first possible implementation, the photovoltaic inverter is a string inverter or a central inverter.

DETAILED DESCRIPTION OF THE EMBODIMENTS

To make persons skilled in the art better understand the embodiments, an application is first described below.

Figure 1:
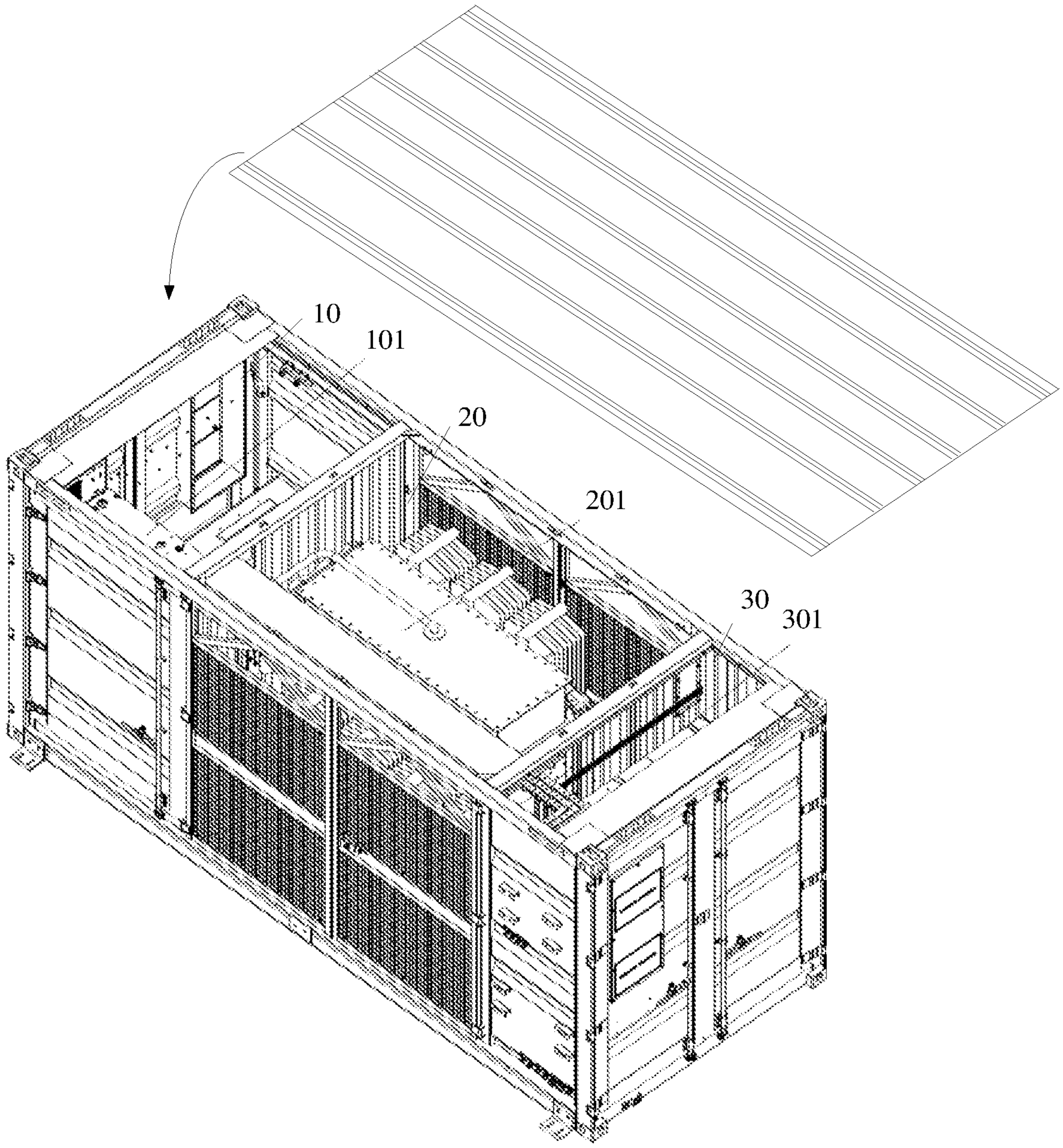
FIG. 1 is a schematic diagram of a prefabricated transformer station.

FIG. 1 is a schematic diagram of a prefabricated transformer station.

The prefabricated transformer station is disposed in a container housing as a whole. To facilitate display and description of an internal structure of the prefabricated transformer station, a top cover of the prefabricated transformer station shown in the figure is removed. It should be noted that, after construction and installation of the prefabricated transformer station are completed, the top cover is present, in other words, the container housing includes a base, four sides, and the top cover, and has good strength and sealing effect.

A low-voltage cabinet accommodating room 10, a transformer room 20, and a medium-voltage cabinet accommodating room 30 are sequentially provided inside the container housing in a length direction. A side wall of each room may also be provided with a maintenance door to facilitate overhaul and maintenance.

The low-voltage cabinet accommodating room 10 is configured to install and dispose a low-voltage cabinet 101, the transformer room 20 is configured to install and dispose an oil-immersed transformer 201, and the medium-voltage cabinet accommodating room 30 is configured to install and dispose a medium-voltage cabinet 301.

Figure 2:
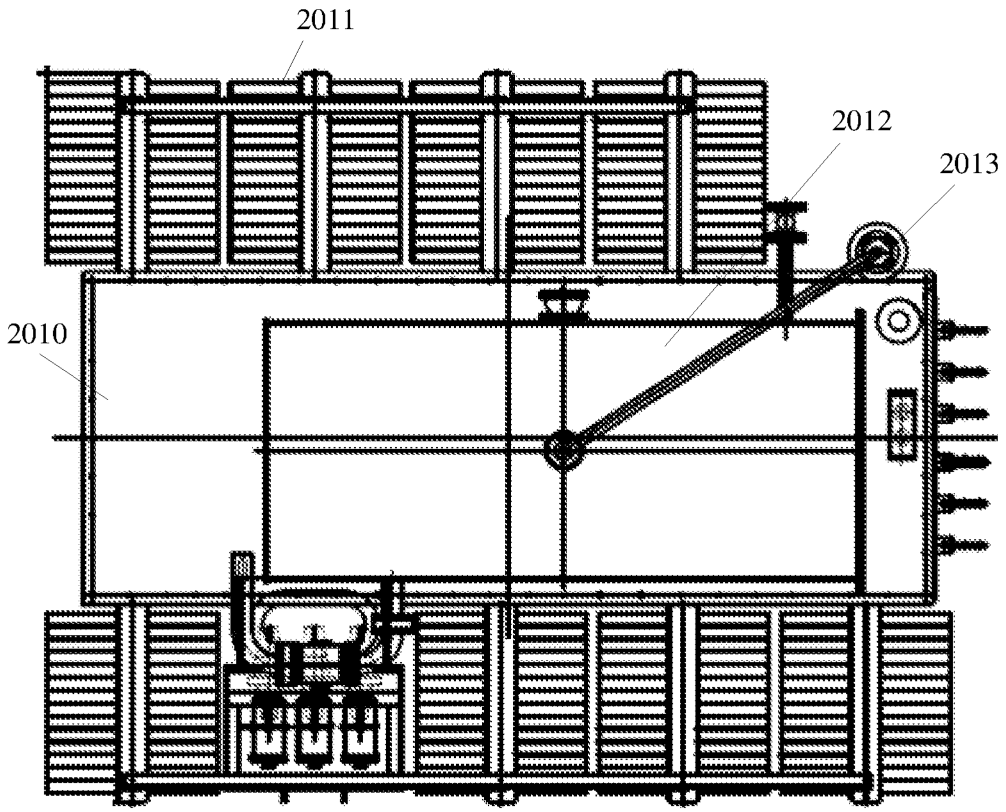
FIG. 2 is a top view of an oil-immersed transformer.
Figure 3:
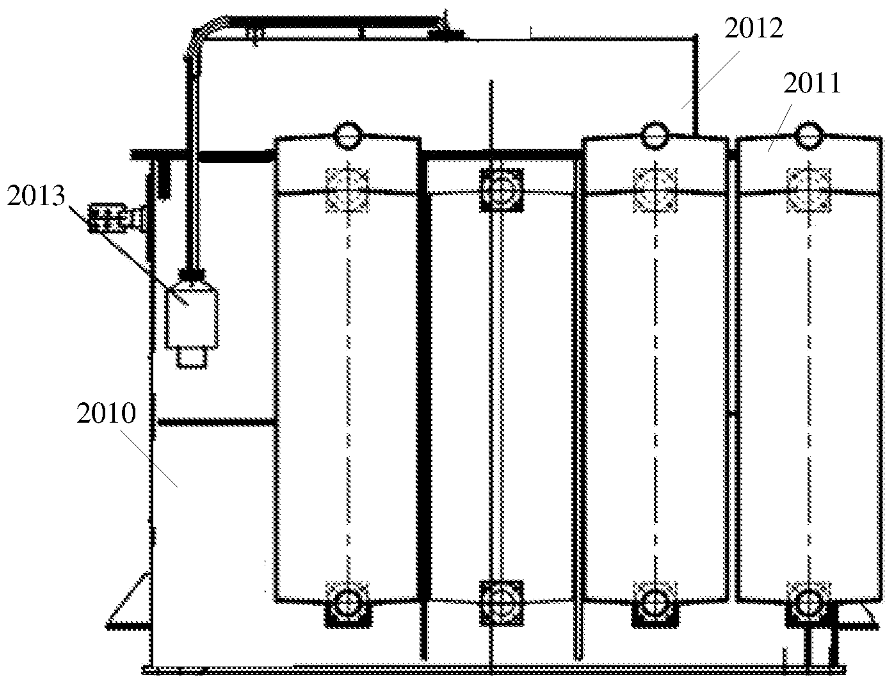
FIG. 3 is a side view of an oil-immersed transformer.

As shown in FIG. 2 and FIG. 3, FIG. 2 is a top view of an oil-immersed transformer, and FIG. 3 is a side view of the oil-immersed transformer.

For a prefabricated transformer station using the oil-immersed transformer, a body (a winding and an iron core) of the oil-immersed transformer is installed in a fuel tank 2010 filled with transformer oil, and the fuel tank 2010 is connected to an oil conservator 2012. The oil conservator 2012 is connected to a moisture absorber 2013 through an air tube, and the moisture absorber 2013 is used to maintain a balance between pressure of the fuel tank 2010 and the oil conservator 2012 and outside pressure. A heat dissipator 2011 is further disposed outside the fuel tank 2010, and a quantity of the heat dissipators 2011 is not limited.

A capacity of the oil-immersed transformer, that is, a rated capacity, is a customary value of apparent power under a main tap (a tap corresponding to a rated parameter). A capacity specified on a transformer nameplate is the rated capacity, which is product of a rated full-load voltage, a rated current, and a corresponding phase coefficient when a tap switch is located in the main tap. The rated capacity is generally expressed in kilovolt-ampere (KVA) or megavolt-ampere (MVA). The transformer is a core component of the prefabricated transformer station, and its capacity is a weight performance index of prefabricated transformer station.

When the capacity of the oil-immersed transformer increases, a diameter of the iron core of the oil-immersed transformer increases, and therefore, a length, a width, and a height of the fuel tank 2010 increase accordingly. On one hand, a size of the fuel tank is directly increased, and on the other hand, a heat dissipation area of the fuel tank 2010 is increased, and the heat dissipator 2011 needs to be added, thereby further increasing space occupation. However, a size of a 20-foot marine container is unchangeable, and therefore, the capacity of the oil-immersed transformer is limited.

To improve the capacity of the oil-immersed transformer, in some solutions, a length of the container may be increased, for example, a 40-foot or longer container may be used. However, this increases transport difficulty and costs. In addition, as the capacity of the oil-immersed transformer increases, the length, the width, and the height of the fuel tank increase accordingly. An increase of the length of the container only correspondingly solves a problem that the length of the fuel tank is increased, and the width and the height of the container still comply with a standard container size, so that a problem that the width and the height of the fuel tank are increased is not solved, and the capacity of the oil-immersed transformer is still limited.

To resolve the foregoing problem, the embodiments may provide a prefabricated transformer station, an installation method, an oil-immersed transformer, and a photovoltaic system. By opening a top cover of a transformer room, and installing an oil conservator above a fuel tank, and an installation position may be higher than a height of a side wall of the transformer room, the fuel tank is not limited in height by a specification of a container housing, and may not occupy an internal space of the container housing, so as to further provide more space for the fuel tank, to improve a capacity of the oil-immersed transformer.

To make persons skilled in the art understand the embodiments more clearly, the following describes the embodiments with reference to the accompanying drawings.

In the following description, terms such as "first" and "second" are used merely for descriptive purposes and cannot be understood as indicating or implying relative importance or implicitly indicating a quantity of indicated technical features.

Unless otherwise limited, a term "connection" should be understood in a broad sense. For example, a "connection" may be a fixed connection, a detachable connection, or an integrated structure, may be a direct connection, or may be an indirect connection through an intermediary.

The oil-immersed transformer in the following description may include a body (components such as a winding and an iron core) of the transformer, and related accessories such as a fuel tank, an oil conservator, and a heat dissipator for installing a transformer.

Figure 4:
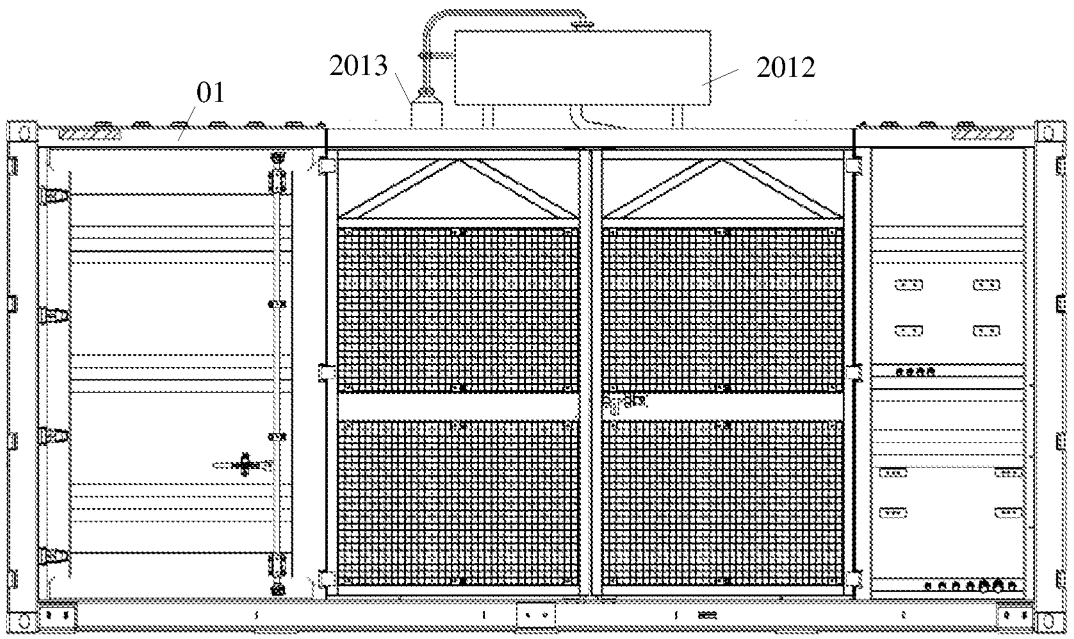
FIG. 4 is a schematic diagram of a prefabricated transformer station according to an embodiment.

FIG. 4 is a schematic diagram of a prefabricated transformer station according to an embodiment.

The figure is a side view along a length direction of the prefabricated transformer station. The prefabricated transformer station provided in this embodiment includes a container housing 01 and an oil-immersed transformer installed and disposed in the container housing 01.

An installation height of an oil conservator 2012 is higher than a height of a side wall of a transformer room.

Figure 5:
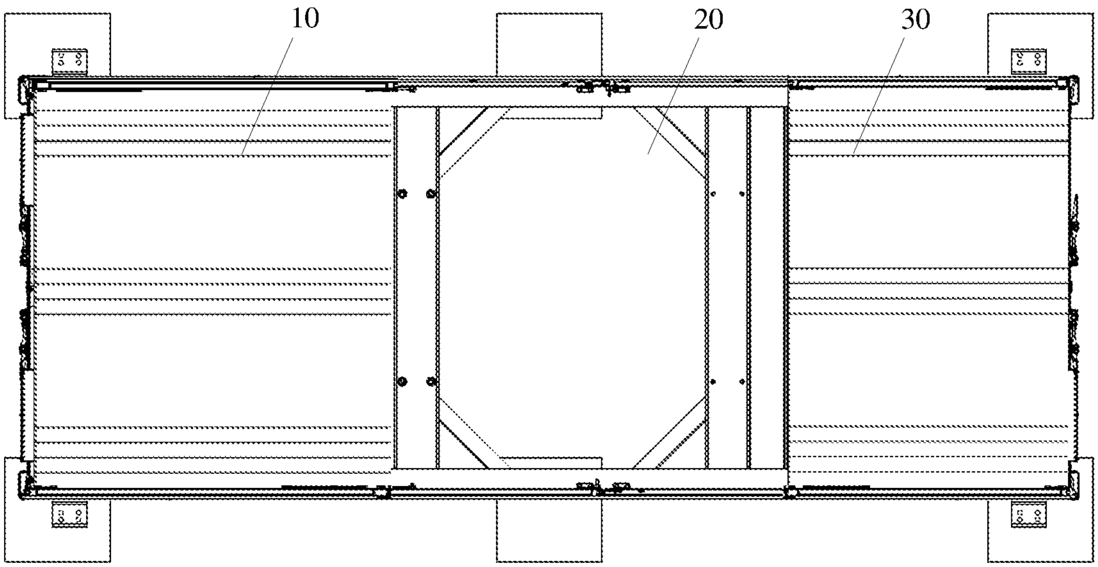
FIG. 5 is a top view of a container housing according to an embodiment.

FIG. 5 is a top view of a container housing according to this embodiment.

A low-voltage cabinet accommodating room 10, a transformer room 20, and a medium-voltage cabinet accommodating room 30 are respectively provided inside the container housing in the length direction. A side wall of each room may also be provided with a maintenance door to facilitate overhaul and maintenance.

The low-voltage cabinet accommodating room 10 is configured to install and dispose a low-voltage cabinet 101, the transformer room 20 is configured to install and dispose the oil-immersed transformer, and the medium-voltage cabinet accommodating room 30 is configured to install and dispose a medium-voltage cabinet 301.

A top cover of the transformer room 20 is opened. That is, the transformer room includes a base and four side walls. A top cover of the low-voltage cabinet accommodating room 10 and a top cover of the medium-voltage cabinet accommodating room 30 are closed.

Figure 6:
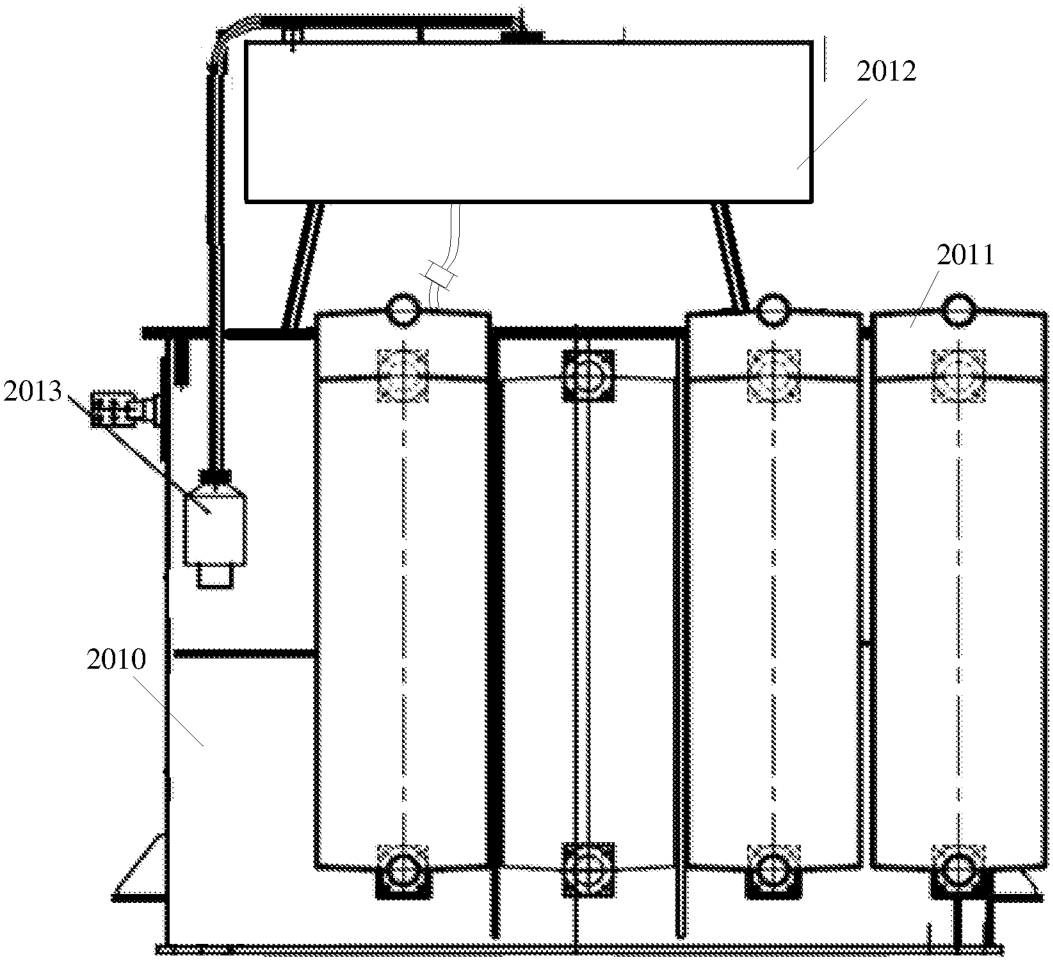
FIG. 6 is a schematic diagram of an oil-immersed transformer according to an embodiment.

FIG. 6 is a schematic diagram of the oil-immersed transformer according to this embodiment.

A fuel tank 2010 of the oil-immersed transformer is separated from the oil conservator 2012, and the oil conservator 2012 is disposed above the fuel tank 2010.

Reasons for using the structures shown in FIG. 4 to FIG. 6 are as follows.

Through experimental measurement and analysis, lengths of the low-voltage cabinet accommodating room 10 and the medium-voltage cabinet accommodating room 30 that are inside the container housing can be properly compressed, to increase a length of the transformer room 20 that is inside the container housing, and an additional length S may be provided to meet a length change of the fuel tank 2010 when the capacity of the oil-immersed transformer increases.

However, it is found through testing that, the additional length S cannot be fully used because, as the capacity of the oil-immersed transformer increases, a diameter D of the iron core increases, and a height H, a length L, and a width W of the fuel tank 2010 increase correspondingly with an increase of D. Although an increase of the length L is less than the additional length S, an increase of the capacity causes the height H of the fuel tank 2010 to reach a maximum internal height of the container housing first. After the height H is limited by a height size of the container housing, the capacity of the transformer cannot be further increased. As a result, a space of the transformer room 20 cannot be fully used.

At the same time, it is further found through testing that, with the increase of the capacity of the oil-immersed transformer, although a size of the fuel tank 2010 increases obviously, sizes of related accessories such as the oil conservator 2012 and the moisture absorber 2013 are not affected by the increase of the capacity of the oil-immersed transformer. As the size of the fuel tank increases, the oil conservator 2012 may become the biggest obstacle to capacity improvement.

If the oil conservator 2012 is removed from an internal space of the transformer room 20, or a height of the transformer room 20 occupied by the oil conservator 2012 is reduced, more growth space can be provided for the fuel tank 2010, thereby achieving a breakthrough in capacity.

Therefore, the embodiments may achieve a capacity breakthrough in a sealed container housing. By opening the top cover of the transformer room 20, a height of a top of the oil conservator 2012 is higher than a height of a side wall of the transformer room 20, that is, higher than a height of the container housing.

In this case, the oil conservator 2012 and the fuel tank may be fixedly connected by using a bracket or may be directly contacted and fixedly connected by using another fastening component. This is not limited in this embodiment.

In addition, an installation height of the oil conservator 2012 is not limited in this embodiment. For example, the oil conservator may be higher than the side wall of the transformer room by a height of half of an oil conservator body, or higher than the side wall of the transformer room by a height of one oil conservator body. The installation height of the oil conservator 2012 may be related to a height of the fuel tank 2010.

In conclusion, by using the prefabricated transformer station provided in this embodiment, because the top cover of the transformer room is opened, the oil conservator is installed above the fuel tank, and the height of the top of the oil conservator is higher than the height of the side wall of the transformer room, the oil conservator may not occupy the internal space of the container housing (in this case, a bottom of the oil conservator is higher than the side wall of the transformer room), or reduce an occupied internal space (in this case, the bottom of the oil conservator is lower than the side wall of the transformer room). In this way, the fuel tank is not limited in height by the specification of the container housing, and therefore, more space can be provided for the fuel tank. The oil-immersed transformer is installed in the fuel tank, and more space is also provided for the oil-immersed transformer, so as to improve the capacity of the oil-immersed transformer.

The prefabricated transformer station can still use the 20-foot marine container, which does not increase transport difficulty and costs of the prefabricated transformer station, breaks the habitual thinking, and modifies the container housing, thereby providing enough space for improvement of the capacity of the oil-immersed transformer.

The following describes an implementation of the prefabricated transformer station.

Figure 7:
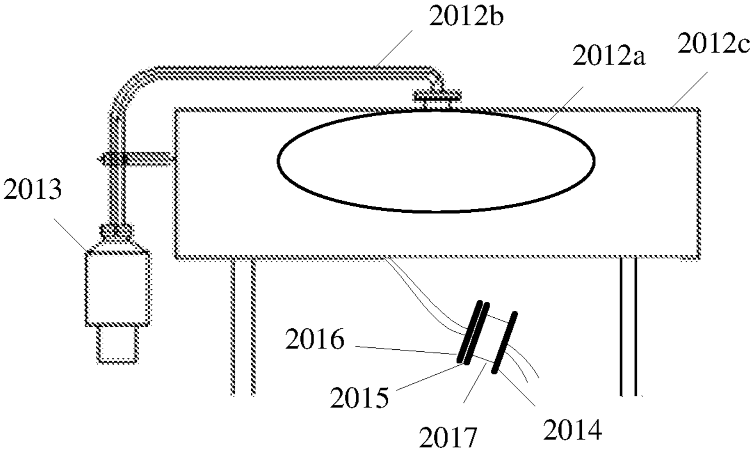
FIG. 7 is a schematic diagram of an oil conservator according to an embodiment.

As shown in FIG. 6 and FIG. 7, FIG. 7 is a schematic diagram of the oil conservator according to this embodiment.

The oil conservator 2012 shown in the figure includes a capsule 2012*a*, an air tube 2012*b*, and an oil conservator body 2012*c*.

The oil conservator body 2012*c* is filled with transformer oil and the capsule 2012*a*.

Air is inside the capsule 2012*a*. A proportion of space occupied by the capsule 2012*a* and the oil conservator body 2012*c* is not limited in this embodiment.

The capsule 2012*a* is connected to a moisture absorber 2013 outside the oil conservator body through the air tube 2012*b*.

The moisture absorber 2013 is configured to maintain a balance between pressure of the oil conservator 2012 and the fuel tank 2010 and outside pressure. That is, when a temperature of the transformer oil increases, the transformer oil swells and its volume increases, so that the air inside the capsule 2012*a* is extruded and discharged to the atmosphere through the air tube 2012*b* and the moisture absorber 2013, and when the temperature of the transformer oil decreases, the transformer oil shrinks, and its volume becomes smaller. External air enters the capsule 2012*a* through the moisture absorber 2013 and the air tube 2012*b*, and the capsule 2012*a* swells, to maintain pressure balance.

The oil conservator 2012 and the fuel tank 2010 are connected through a pipe, and a gas relay 2017 is disposed on the pipe.

The gas relay 2017 is a protection device used by the oil-immersed transformer. Its working principle is as follows.

When a fault occurs in the fuel tank, an electric arc generated by a current decomposes the transformer oil and another insulation material, thereby generating a large amount of gas (for example, some combustible gas). Therefore, a degree of the internal fault of the fuel tank is more serious, the more gas is generated, a flow rate is faster, and air flow may contain small and hot transformer oil. The gas relay uses hot air flow and hot oil flow that are generated by thermal decomposition of the transformer oil to trigger a protection action, to generate an alarm (light gas) or cut off the oil-immersed transformer (heavy gas).

The light gas may reflect the gas decomposed by the transformer oil rises up into the gas relay when an operation or a slight fault occurs, and air pressure lowers an oil surface so as to trigger the gas relay to act. When the gas is excessive, the gas can be discharged by a gas nozzle of the gas relay.

The heavy gas may reflect a large amount of gas that is generated by serious faults (including, but not limited to, faults such as turn-to-turn short circuits in which transformer protection measures cannot be acted quickly) occurring in the fuel tank and that enters the gas relay, to push the oil flow to trigger a cutting action of the gas relay.

The pipe connecting the oil conservator 2012 and the fuel tank 2010 is divided into two parts: a first pipe and a second pipe. A first butterfly valve 2014, a second butterfly valve 2015, and a third butterfly valve 2016 are further disposed on the pipe.

The first butterfly valve 2014 is connected between a port on a fuel tank side of the gas relay 2017 and a first end of the first pipe. A second end of the first pipe is connected to the fuel tank.

The second butterfly valve 2015 is connected between a port on an oil conservator side of the gas relay 2017 and a first end of the third butterfly valve 2016. A second end of the third butterfly valve 2016 is connected to a first end of the second pipe. A second end of the second pipe is connected to the oil conservator 2012.

When the first butterfly valve 2014 is closed, the transformer oil in the first pipe can be prevented from leaking out.

When the second butterfly valve 2015 is closed, the transformer oil can be prevented from leaking out from the port on the oil conservator side of the gas relay 2017.

When the third butterfly valve 2016 is closed, the transformer oil in the second pipe can be prevented from leaking out.

When the first butterfly valve 2014, the second butterfly valve 2015, and the third butterfly valve 2016 are all closed, the second butterfly valve 2015 and the third butterfly valve 2016 can be disconnected. In this case, the oil conservator 2012 together with the second pipe and the third butterfly valve 2016 can be detached. The second butterfly valve 2015, the gas relay 2017, the first butterfly valve 2014, the first pipe, and the fuel tank 2010 are connected as a whole, so as to facilitate installation, maintenance, and height adjustment of the oil conservator 2012.

The foregoing embodiment further facilitates transportation of the prefabricated transformer station. That is, during transportation, the oil conservator 2012 that has been injected with the transformer oil, together with the second pipe and the third butterfly valve 2016, may be first detached, and fixedly placed in a low-voltage cabinet accommodation room. The second butterfly valve 2015, the gas relay 2017, the first butterfly valve 2014, the first pipe, and the fuel tank 2010 are fixedly installed in the transformer room. That is, in this case, a same transportation measure may be taken as that of an existing prefabricated transformer station. The oil conservator 2012 and an associated portion are taken out for installation after arriving at a destination.

In addition, a portion of the top cover of the transformer room of the container housing may be preserved after being opened. In some implementations, the top cover may be turned over and lean against the grid door of the container, or suspended to the grid door of the container, or stored after being detached.

In some embodiments, the base and the grid door of the transformer room are provided with air holes for ventilation and heat dissipation. In addition, the air holes of the base may also be used to drain accumulated water or the transformer oil. A quantity, an arrangement manner, and a shape of the air holes are not limited in this embodiment.

In some embodiments, a medium voltage used for the prefabricated transformer station ranges from 10 kV to 35 kV, and a low voltage used for the prefabricated transformer station ranges from 0.4 kV to 1.5 kV.

A specification for the container housing of the prefabricated transformer station is the 20-foot marine container, to meet land and marine standard requirements at home and abroad. In addition, a container of another specification may also be used based on a requirement of an actual scenario. This is not limited in this embodiment. However, when the container of another specification is used, the capacity of the oil-immersed transformer may also be improved by using the embodiments.

An embodiment may further provide an installation method of a prefabricated transformer station. The following provides descriptions with reference to accompanying drawings.

Figure 8:
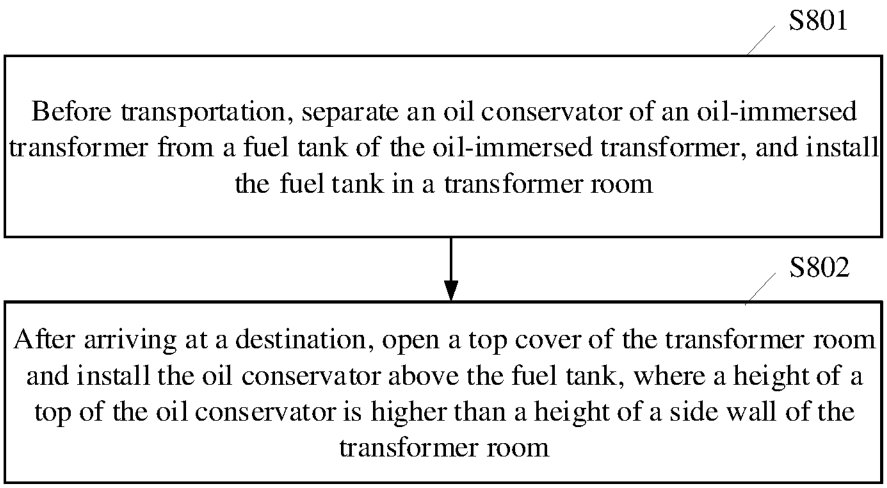
FIG. 8 is a flowchart of an installation method of a prefabricated transformer station according to an embodiment.

FIG. 8 is a flowchart of the installation method of the prefabricated transformer station according to this embodiment.

For an implementation of the prefabricated transformer station, refer to description in the foregoing embodiment. Details are not described herein again.

Figure 9:
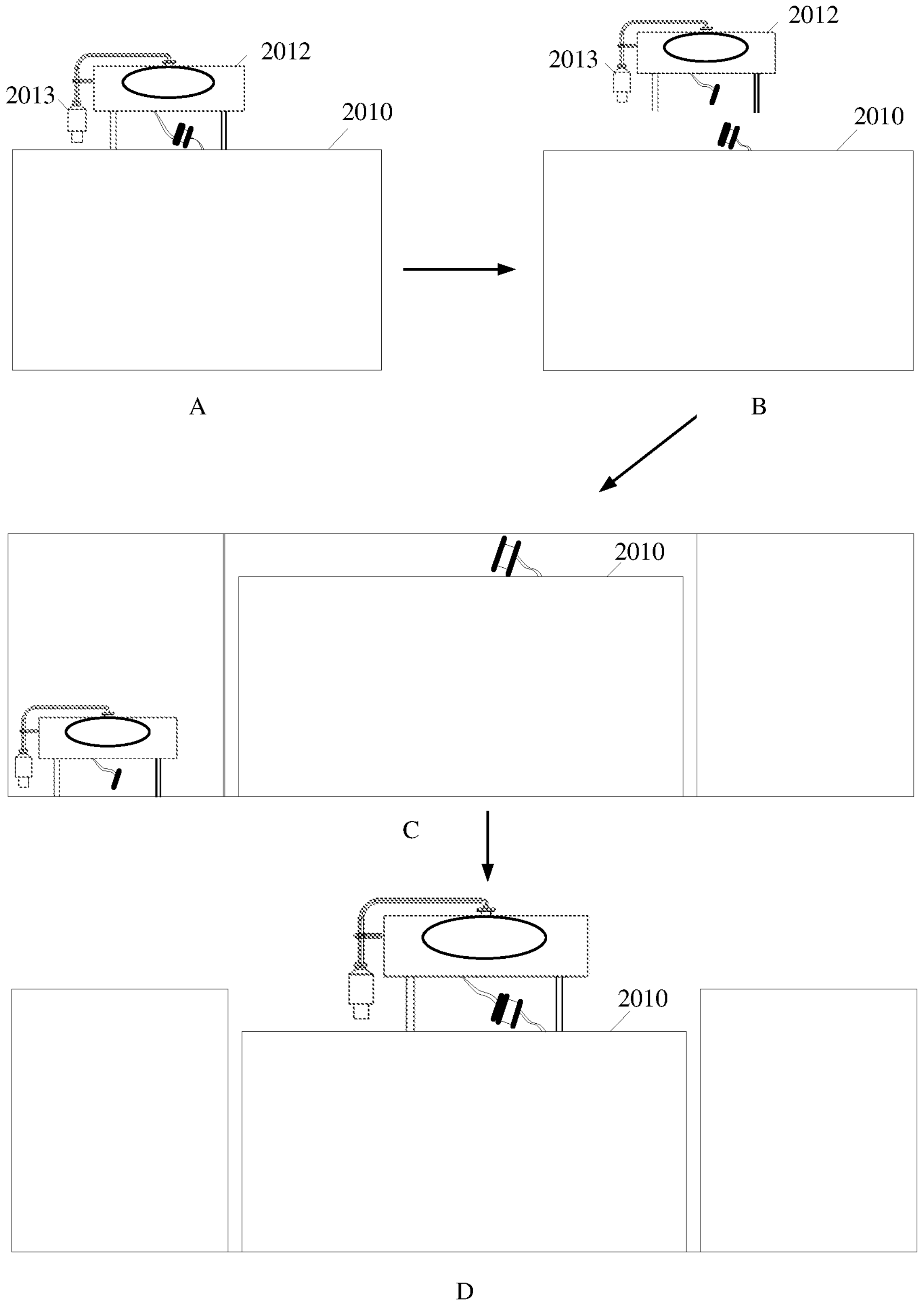
FIG. 9 is a schematic diagram corresponding to an installation method according to an embodiment.

FIG. 9 is a schematic diagram corresponding to the installation method according to this embodiment.

The installation method includes the following steps.

S801: Before transportation, separate an oil conservator of an oil-immersed transformer from a fuel tank of the oil-immersed transformer, and install the fuel tank in a transformer room.

Currently, the prefabricated transformer station is inspected and installed before delivery and then is transported to a destination. In the embodiments, an installation height of the oil conservator may need to be higher than a height of a side wall of the transformer room, that is, higher than a height of a container housing.

To avoid increasing transport difficulty and costs, as shown in A in FIG. 8, the oil-immersed transformer is completely installed before delivery, and oil is injected into a fuel tank 2010 and the oil conservator to complete a test. As shown in B in FIG. 8, after the test is completed, an oil conservator 2012 and the fuel tank 2010 are connected to a butterfly valve on a pipe. That is, a first butterfly valve, a second butterfly valve, and a third butterfly valve are closed, so as to avoid transformer oil leakage and separate the oil conservator 2012 from the fuel tank 2010.

As shown in C in FIG. 8, the oil conservator 2012 is fastened in a low-voltage cabinet accommodating room of the container housing during transportation. Therefore, the transportation difficulty and costs of the prefabricated transformer station is not increased.

S802: After arriving at the destination, open a top cover of the transformer room and install the oil conservator above the fuel tank, where a height of a top of the oil conservator is higher than the height of the side wall of the transformer room.

As shown in D in FIG. 8, after arriving at the destination, installation is performed: open the top cover of the transformer room, remove the oil conservator from the low-voltage cabinet accommodating room, and install the oil conservator above the fuel tank. The height of the top of the oil conservator is higher than the height of the side wall of the transformer room. In some embodiments, a height of a bottom of the oil conservator is higher than the height of the side wall of the transformer room. In some other embodiments, the height of the bottom of the oil conservator is lower than the height of the side wall of the transformer room.

In summary, when this method is used to transport the prefabricated transformer station, and the method for transporting the 20-foot container can still be used during transportation, which avoids an increase of the transport difficulty and costs.

An embodiment may further provide an oil-immersed transformer, used in the prefabricated transformer station provided in the foregoing embodiment. The following continues to refer to the oil-immersed transformer shown in FIG. 6 for description.

A body (a winding and an iron core) of the oil-immersed transformer is installed in a fuel tank 2010 filled with transformer oil, and a heat dissipator 2011 is disposed outside the fuel tank 2010. Distribution and a quantity of the heat dissipator 2011 are not limited in this embodiment.

The fuel tank 2010 and an oil conservator 2012 may be separate. In a possible implementation, the oil conservator 2012 and the fuel tank 2010 may be connected by using a bracket.

The oil conservator 2012 is disposed above the fuel tank 2010, and an installation height of the oil conservator 2012 is higher than a height of a side wall of a transformer room, that is, higher than a height of a container housing.

An oil conservator is shown in FIG. 7. The fuel tank 2010 and the oil conservator are connected through a pipe. A gas relay 2017 is disposed on the pipe. The gas relay 2017 is configured to: when an internal fault occurs in the oil-immersed transformer, generate an alarm or cut off the oil-immersed transformer.

The oil conservator 2012 includes a capsule 2012*a*, an air tube 2012*b*, and an oil conservator body 2012*c*.

The oil conservator body 2012*c* is filled with transformer oil and the capsule 2012*a*.

Air is inside the capsule 2012*a*. A proportion of space occupied by the capsule 2012*a* and the oil conservator body 2012*c* is not limited in this embodiment.

The capsule 2012*a* is connected to a moisture absorber 2013 outside the oil conservator body through the air tube 2012*b*.

The moisture absorber 2013 is configured to maintain a balance between pressure of the oil conservator 2012 and the fuel tank 2010 and outside pressure. That is, when a temperature of the transformer oil increases, the transformer oil swells and its volume increases, so that the air inside the capsule 2012*a* is extruded and discharged to the atmosphere through the air tube 2012*b* and the moisture absorber 2013, and when the temperature of the transformer oil decreases, the transformer oil shrinks, and its volume becomes smaller. External air enters the capsule 2012*a* through the moisture absorber 2013 and the air tube 2012*b*, and the capsule 2012*a* swells, to maintain pressure balance.

Further, the oil-immersed transformer further includes a first butterfly valve 2014, a second butterfly valve 2015, and a third butterfly valve 2016. The pipe includes a first pipe and a second pipe.

The first butterfly valve 2014 is connected between a port on a fuel tank side of the gas relay 2017 and a first end of the first pipe. A second end of the first pipe is connected to the fuel tank 2010.

The second butterfly valve 2015 is connected between a port on an oil conservator side of the gas relay 2017 and a first end of the third butterfly valve 2016. A second end of the third butterfly valve 2016 is connected to a first end of the second pipe. A second end of the second pipe is connected to the oil conservator.

When the first butterfly valve 2014 is closed, the transformer oil in the first pipe can be prevented from leaking out.

When the second butterfly valve 2015 is closed, the transformer oil can be prevented from leaking out from the port on the oil conservator side of the gas relay 2017.

When the third butterfly valve 2016 is closed, the transformer oil in the second pipe can be prevented from leaking out.

When the first butterfly valve 2014, the second butterfly valve 2015, and the third butterfly valve 2016 are all closed, the second butterfly valve 2015 and the third butterfly valve 2016 can be disconnected. In this case, the oil conservator 2012 together with the second pipe and the third butterfly valve 2016 can be detached. The second butterfly valve 2015, the gas relay 2017, the first butterfly valve 2014, the first pipe, and the fuel tank 2010 are connected as a whole, so as to facilitate installation, maintenance, and height adjustment of the oil conservator 2012.

In conclusion, the oil conservator of the oil-immersed transformer provided in this embodiment is installed above the fuel tank, and the height of the top of the oil conservator is higher than the height of the side wall of the transformer room, so that the oil conservator may not occupy the internal space of the container housing, or reduce an occupied internal space. In this way, the fuel tank is not limited in height by a specification for the container housing, and therefore, more space can be provided for the fuel tank. The oil-immersed transformer is installed in the fuel tank, and more space is also provided for the oil-immersed transformer, so as to improve a capacity of the oil-immersed transformer.

The container housing of the prefabricated transformer station provided in this embodiment may use the 20-foot marine container, and a product container body meets the land and marine standard requirements at home and abroad. The medium-voltage cabinet accommodating room and the low-voltage cabinet accommodating room have excellent dust-proof sealing effect and are applicable to power generation sites such as photovoltaic power stations and wind power stations, and electricity places such as mines, factories and enterprises, and oil and gas fields. The following uses the container housing of the prefabricated transformer station used in the photovoltaic system as an example for description.

Photovoltaic power generation is a technology that uses photovoltaic effect of a semiconductor interface to convert light energy into electric energy. When the prefabricated transformer station is used in the photovoltaic system, a prestage of the prefabricated transformer station is connected to a photovoltaic inverter. The photovoltaic inverter is configured to convert a direct current into an alternating current and then transmit the alternating current to the prefabricated transformer station.

Figure 10:
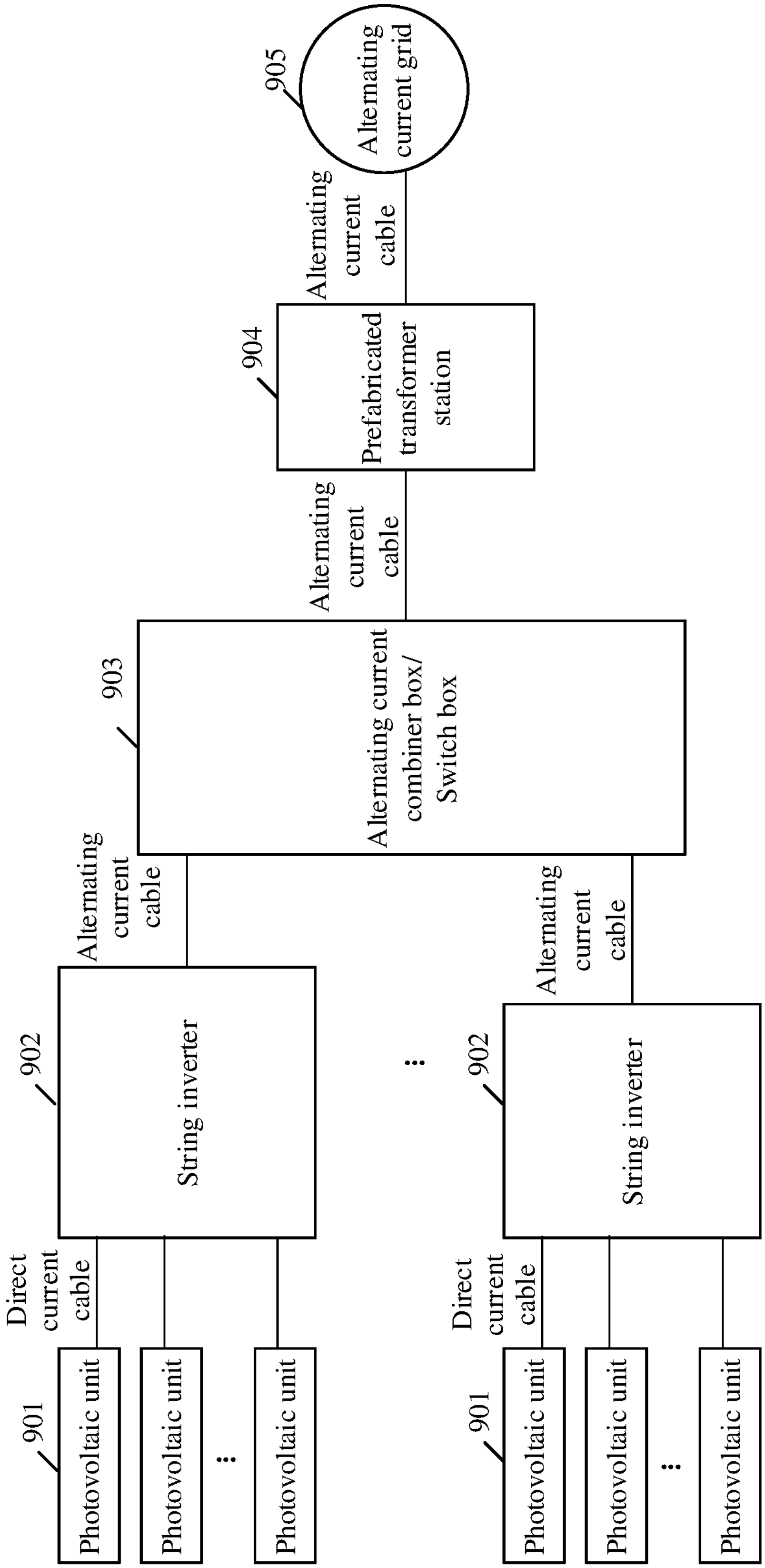
FIG. 10 is a schematic diagram of a photovoltaic system according to an embodiment.

FIG. 10 is a schematic diagram of a photovoltaic system according to an embodiment.

The photovoltaic system shown in the figure includes a photovoltaic unit 901, a string inverter 902, an alternating current combiner box/a switch box 903, and a prefabricated transformer station 904.

Each photovoltaic unit 901 includes one or more photovoltaic modules. The photovoltaic module is a direct current power supply formed after solar cells are connected in series and in parallel and then are packaged.

When the photovoltaic unit 901 includes a plurality of photovoltaic modules, the plurality of photovoltaic modules may form a photovoltaic string by connecting a positive electrode and a negative electrode in series, to form the photovoltaic unit 901. Alternatively, the plurality of photovoltaic modules may be first connected in series to form a plurality of photovoltaic strings, and then the plurality of photovoltaic strings may be connected in parallel to form the photovoltaic unit 901.

A direct current side of the string inverter 902 is connected to one or more photovoltaic units 901. In actual application, the direct current side of the string inverter 902 is generally connected to a plurality of photovoltaic units 901.

The string inverter 902 includes a two-stage power conversion circuit. A first stage is a direct current (DC)-direct current circuit, and a second stage is a direct current-alternating current (AC) circuit, that is, an inverter circuit. The string inverter generally includes multiple DC-DC circuits. A positive output port of the multiple DC-DC circuits is connected in parallel to a positive input port on a direct current side of the DC-AC circuit. A negative output port of the multiple DC-DC circuits is connected in parallel to a negative input port on the direct current side of the DC-AC circuit. An alternating current cable outlet of the DC-AC circuit is an output of the string inverter 902.

An alternating current output by multiple string inverters 902 is converged by the alternating current combiner box/switch box 903 and then transmitted to the prefabricated transformer station 904 and is connected to an alternating current grid 905 after being transformed.

Figure 11:
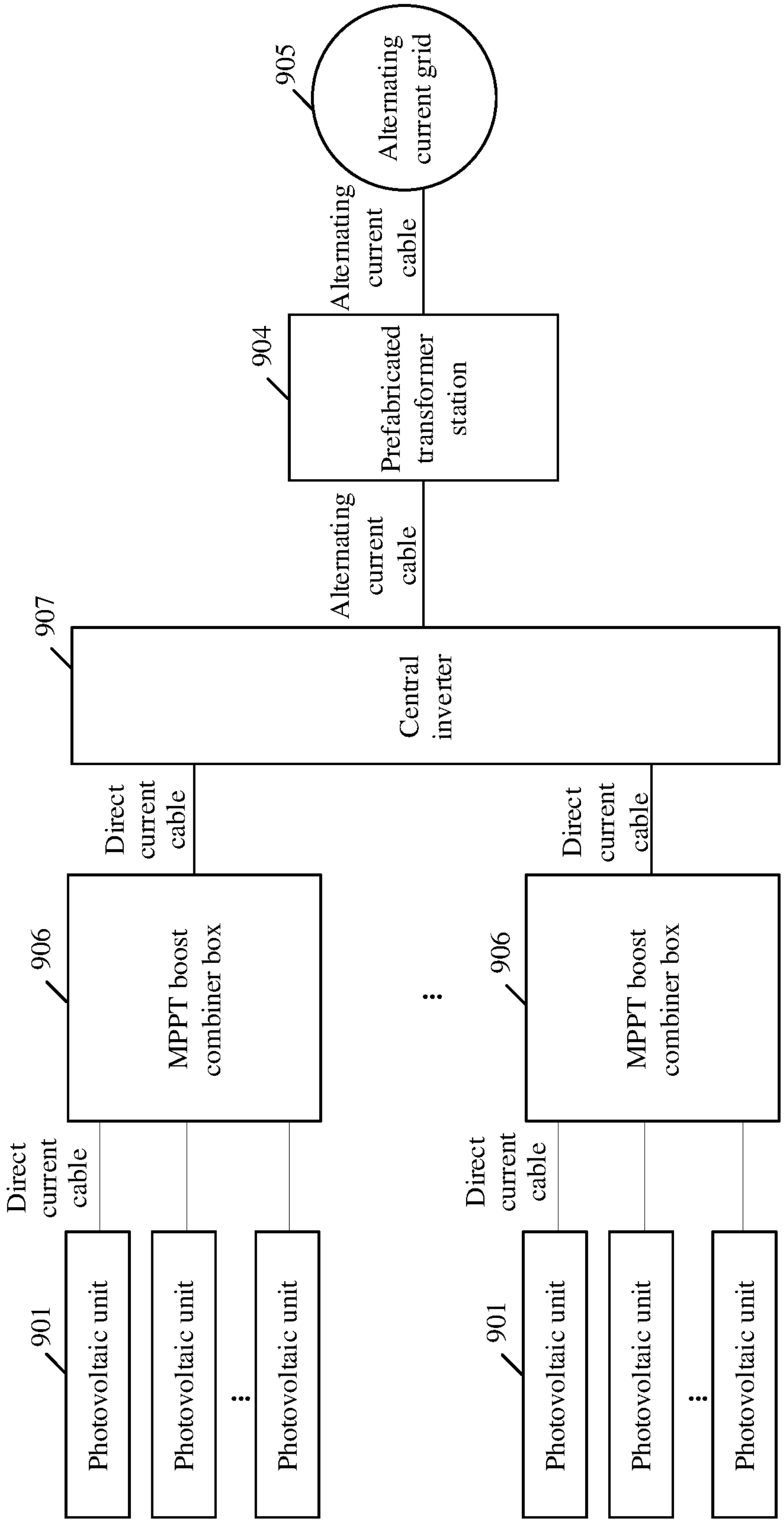
FIG. 11 is a schematic diagram of another photovoltaic system according to an embodiment.

FIG. 11 is a schematic diagram of another photovoltaic system according to an embodiment.

The photovoltaic system shown in the figure includes a photovoltaic unit 901, an MPPT boost combiner box 906, a central inverter 907, and a prefabricated transformer station 904.

The maximum power point tracking (MPPT) boost combiner box 906 is a DC-DC boost converter, and generally includes at least two DC-DC circuits. Each DC-DC circuit is connected to at least one photovoltaic unit.

A positive output port of each DC-DC circuit is connected in parallel to a positive electrode of an output direct current bus, and a negative output port of each DC-DC circuit is connected in parallel to a negative electrode of the output direct current bus.

The positive electrode and the negative electrode of the direct current bus are respectively used as a positive output port of the MPPT boost combiner box 906 and a negative output port of the MPPT boost combiner box 20, and are respectively connected to a positive input port and a negative input port of the rear-stage central inverter 907 through a direct current cable.

The central inverter 907 is configured to convert single or multiple direct current input that is connected in parallel and that is connected to a direct current side into alternating current output, and generally uses DC-AC single-stage power conversion. An alternating current output by the central inverter 907 is transformed by the prefabricated transformer station 904 and then is converged into an alternating current grid 905.

For an implementation and an installation method of the prefabricated transformer station 904, refer to related descriptions in the foregoing embodiment. Details are not described herein again.

In conclusion, the top cover of the transformer room of the prefabricated transformer station in this embodiment is opened, the oil conservator is installed above the fuel tank, and the height of the top of the oil conservator is higher than the height of the side wall of the transformer room, so that the oil conservator may not occupy the internal space of the container housing, or reduce the occupied internal space. In this way, the fuel tank is not limited in height by the specification of the container housing, and therefore, more space can be provided for the fuel tank. The oil-immersed transformer is installed in the fuel tank, and more space is also provided for the oil-immersed transformer, so as to improve the capacity of the oil-immersed transformer. That is, the capacity of the prefabricated transformer station is improved.

As the capacity of the prefabricated transformer station increases, a quantity of prefabricated transformer stations that need to be constructed for the photovoltaic system can be reduced, and construction costs and operation and maintenance costs of the photovoltaic system can be further reduced.

It should be understood that, "at least one (item)" refers to one or more and "a plurality of" refers to two or more. The term "and/or" is used for describing an association relationship between associated objects and represents that three relationships may exist. For example, "A and/or B" may represent the following three cases: only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

The foregoing embodiments are merely intended for describing rather than limiting the embodiments. Although described in detail with reference to the foregoing embodiments, persons of ordinary skill in the art should understand that they may still make without departing from the scope of the embodiments.

What is claimed:

1. A prefabricated transformer station, the prefabricated transformer station comprising a container housing and an oil-immersed transformer;

a transformer room is provided inside the container housing, and a top cover of the transformer room is opened; and the oil-immersed transformer is installed in the transformer room, and a height of a top of an oil conservator of the oil-immersed transformer is higher than a height of a side wall of the transformer room, wherein the oil conservator further comprises a capsule, an air tube, and an oil conservator body, and the prefabricated transformer station further comprises a moisture absorber;

the oil conservator body is filled with the transformer oil and the capsule;

the capsule is connected to the moisture absorber outside the oil conservator body through the air tube; and the moisture absorber is configured to maintain a balance between pressure of the oil conservator and a fuel tank and outside pressure.

2. The prefabricated transformer station according to claim 1, wherein the fuel tank and the oil conservator are connected through a pipe, and a gas relay is disposed on the pipe; and the gas relay is configured to:

when an internal fault occurs in the oil-immersed transformer, generate an alarm or cut off the oil-immersed transformer.

3. The prefabricated transformer station according to claim 2, further comprising:

a first butterfly valve;

a second butterfly valve; and a third butterfly valve, wherein the pipe further comprises a first pipe and a second pipe;

the first butterfly valve is connected between a port on a fuel tank side of the gas relay and a first end of the first pipe, and a second end of the first pipe is connected to the fuel tank;

the second butterfly valve is connected between a port on an oil conservator side of the gas relay and a first end of the third butterfly valve, a second end of the third butterfly valve is connected to a first end of the second pipe, and a second end of the second pipe is connected to the oil conservator; and the first butterfly valve, the second butterfly valve, and the third butterfly valve are configured to avoid transformer oil leakage of the oil-immersed transformer when being closed, to enable the second butterfly valve and the third butterfly valve to be disconnected.

4. The prefabricated transformer station according to claim 1, wherein a base and a grid door of the transformer room are provided with air holes.

5. The prefabricated transformer station according to claim 1, wherein a medium voltage used for the prefabricated transformer station ranges from 10 kV to 35 kV.

6. The prefabricated transformer station according to claim 1, wherein a low voltage used for the prefabricated transformer station ranges from 0.4 kV to 1.5 kV.

7. The prefabricated transformer station according to claim 1, wherein a specification for the container housing is a 20-foot marine container.

8. The prefabricated transformer station according to claim 1, wherein the oil conservator and the fuel tank of the oil-immersed transformer are connected by using a bracket.

9. The prefabricated transformer station according to claim 1, wherein a height of a bottom of the oil conservator is higher than the height of the side wall of the transformer room.

10. An oil-immersed transformer, used in a prefabricated transformer station, the prefabricated transformer station comprising a container housing, a transformer room configured to install the oil-immersed transformer is provided inside the container housing, and the oil-immersed transformer comprises a fuel tank and an oil conservator; and the oil conservator is disposed above the fuel tank, and a height of a top of the oil conservator is higher than a height of a side wall of the transformer room, wherein the oil conservator further comprises a capsule, an air tube, and an oil conservator body, and the prefabricated transformer station further comprises a moisture absorber;

the oil conservator body is filled with the transformer oil and the capsule;

the capsule is connected to the moisture absorber outside the oil conservator body through the air tube; and the moisture absorber is configured to maintain a balance between pressure of the oil conservator and the fuel tank and outside pressure.

11. The oil-immersed transformer according to claim 10, wherein the fuel tank and the oil conservator are connected through a pipe, and a gas relay is disposed on the pipe; and the gas relay is configured to:

when an internal fault occurs in the oil-immersed transformer, generate an alarm or cut off the oil-immersed transformer.

12. The oil-immersed transformer according to claim 11, wherein the prefabricated transformer station further comprises a first butterfly valve, a second butterfly valve, and a third butterfly valve, and the pipe comprises a first pipe and a second pipe;

the first butterfly valve is connected between a port on a fuel tank side of the gas relay and a first end of the first pipe, and a second end of the first pipe is connected to the fuel tank;

the second butterfly valve is connected between a port on an oil conservator side of the gas relay and a first end of the third butterfly valve, a second end of the third butterfly valve is connected to a first end of the second pipe, and a second end of the second pipe is connected to the oil conservator; and the first butterfly valve, the second butterfly valve, and the third butterfly valve are configured to avoid transformer oil leakage of the oil-immersed transformer when being closed, to enable the second butterfly valve and the third butterfly valve to be disconnected.

13. The oil-immersed transformer according to a claim 10, wherein the oil conservator and the fuel tank of the oil-immersed transformer are connected by using a bracket.

14. A photovoltaic system, wherein the photovoltaic system comprises a prefabricated transformer station and a photovoltaic inverter; and the prefabricated transformer station comprising a container housing and an oil-immersed transformer;

a transformer room is provided inside the container housing, and a top cover of the transformer room is opened; and the oil-immersed transformer is installed in the transformer room, and a height of a top of an oil conservator of the oil-immersed transformer is higher than a height of a side wall of the transformer room; and the photovoltaic inverter is configured to convert a direct current into an alternating current and then transmit the alternating current to the prefabricated transformer station, wherein the oil conservator further comprises a capsule, an air tube, and an oil conservator body, and the prefabricated transformer station further comprises a moisture absorber;

the oil conservator body is filled with the transformer oil and the capsule;

the capsule is connected to the moisture absorber outside the oil conservator body through the air tube; and the moisture absorber is configured to maintain a balance between pressure of the oil conservator and a fuel tank and outside pressure.

15. The photovoltaic system according to claim 14, wherein the photovoltaic inverter is a string inverter or a central inverter.

16. The photovoltaic system according to claim 15, wherein the fuel tank and the oil conservator are connected through a pipe, and a gas relay is disposed on the pipe; and the gas relay is configured to:

when an internal fault occurs in the oil-immersed transformer, generate an alarm or cut off the oil-immersed transformer.

17. The photovoltaic system according to claim 16, wherein the prefabricated transformer station further comprises a first butterfly valve, a second butterfly valve, and a third butterfly valve, and the pipe comprises a first pipe and a second pipe;

the first butterfly valve is connected between a port on a fuel tank side of the gas relay and a first end of the first pipe, and a second end of the first pipe is connected to the fuel tank;

the second butterfly valve is connected between a port on an oil conservator side of the gas relay and a first end of the third butterfly valve, a second end of the third butterfly valve is connected to a first end of the second pipe, and a second end of the second pipe is connected to the oil conservator; and the first butterfly valve, the second butterfly valve, and the third butterfly valve are configured to avoid transformer oil leakage of the oil-immersed transformer when being closed, to enable the second butterfly valve and the third butterfly valve to be disconnected.

* * * * *